US010833867B2

(12) United States Patent
Chen et al.

(10) Patent No.: US 10,833,867 B2
(45) Date of Patent: *Nov. 10, 2020

(54) MANAGING INTERVAL BOUNDARIES FOR GROUPED AND DIGITALLY SIGNED COMPUTER-BASED RECORDS

(71) Applicant: International Business Machines Corporation, Armonk, NY (US)

(72) Inventors: Colin D. Chen, Poughkeepsie, NY (US); Bonnie M. Ordonez, Poughkeepsie, NY (US); Anthony Sofia, Hopewell-Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 203 days.

This patent is subject to a terminal disclaimer.

(21) Appl. No.: 15/798,643

(22) Filed: Oct. 31, 2017

(65) Prior Publication Data

US 2019/0103978 A1 Apr. 4, 2019

Related U.S. Application Data

(63) Continuation of application No. 15/725,071, filed on Oct. 4, 2017.

(51) Int. Cl.
G06F 21/64 (2013.01)
H04L 9/32 (2006.01)
H04L 29/06 (2006.01)

(52) U.S. Cl.
CPC ............ H04L 9/3247 (2013.01); G06F 21/64 (2013.01); H04L 9/3297 (2013.01); H04L 63/12 (2013.01);

(Continued)

(58) Field of Classification Search
CPC ............................. G06F 16/901; G06F 16/783
See application file for complete search history.

(56) References Cited

U.S. PATENT DOCUMENTS 9,471,119 B2 10/2016 Dayka et al.
9,722,797 B2 8/2017 Dayka et al.
(Continued)

OTHER PUBLICATIONS

Chen et al., "Managing Interval Boundaries for Grouped and Digitally Signed Computer-Based Records," U.S. Appl. No. 15/725,071, filed Oct. 4, 2017.

(Continued)

*Primary Examiner* — Olugbenga O Idowu
(74) *Attorney, Agent, or Firm* — Cantor Colburn LLP; Teddi Maranzano

(57) ABSTRACT

Embodiments provide a computer-implemented method for managing interval boundaries of electronic records. The method includes receiving electronic records, associating a first selection criterion and second selection criterion with the electronic records, and associating some of the electronic records with a group based at least in part on determining that the second selection criterion is within a predetermined range of a first threshold. The method further includes generating a group record that identifies the group, associating a third selection criterion with the group record, the third selection criterion being within the interval boundaries, and identifying an expiration of an interval boundary based at least in part on determining that the electronic data representing the third selection criterion is within a predetermined range of a second threshold.

7 Claims, 5 Drawing Sheets

(52) U.S. Cl.
CPC .... *H04L 63/123* (2013.01); *G06F 2221/2101* (2013.01); *G06F 2221/2151* (2013.01)

(56) References Cited

U.S. PATENT DOCUMENTS

| | | |
|---|---|---|
| 2015/0026147 A1 | 1/2015 | Jonsson et al. |
| 2015/0278690 A1 | 10/2015 | Bialk et al. |
| 2015/0327192 A1 | 11/2015 | Amano et al. |
| 2016/0359910 A1* | 12/2016 | Chen ................ G06F 16/215 |
| 2017/0090773 A1 | 3/2017 | Vijayan et al. |

OTHER PUBLICATIONS

List of IBM Patents or Patent Applications Treated As Related; Date Filed: Oct. 31, 2017, 2 pages.

Anonymous, "Method and System for Executing High Performance Record Read Operation from a Byte Stream," IP.com No. IPCOM000235454D, Feb. 2014, 2 pages.

\* cited by examiner

EXAMPLE RECORD SEQUENCE - 5 MINUTE INTERVAL

REC n0 - 23:58:56
REC n1 - 23:58:59
REC n2 - 23:59:02
REC n3 - 00:00:05

FIRST SCENARIO OF AN INTERVAL CLOSING PER EMBODIMENTS OF THE INVENTION

REC n2 - 23:59:02
GROUP RECORD - 23:59:02
NEW INTERVAL RECORD - 23:59:02
REGULARLY SCHEDULED BUT NOW EMPTY INTERVAL RECORD WITH TIMESTAMP GREATER THAN 00:00:05
REC n3 - 00:00:05 <--- THIS WAS THE TRIGGERING EVENT

SECOND SCENARIO OF AN INTERVAL CLOSING PER EMBODIMENTS OF THE INVENTION

REC n2 - 23:59:02
GROUP RECORD - 23:59:02 CREATED BY THE INTERVAL AT 00:00:01
INTERVAL RECORD - 00:00:01 THIS IS THE TRIGGERING EVENT
REC n3 - 00:00:05

FIG. 4

MANAGING INTERVAL BOUNDARIES FOR GROUPED AND DIGITALLY SIGNED COMPUTER-BASED RECORDS

DOMESTIC PRIORITY

This application is a continuation of U.S. application Ser. No. 15/725,071, filed Oct. 4, 2017, the contents of which are incorporated by reference herein in its entirety.

BACKGROUND

The present invention relates generally to the use of digital signature authentication processes to validate computer-based records. More specifically, the present invention relates to optimized techniques for managing interval boundaries of digitally signed computer-based records that can be stored in groups and efficiently removed from storage and validated at predetermined interval boundaries.

A digital signature can be defined as a computer-based technique to validate the authenticity and integrity of electronic data such as messages, software, digital documents, electronic transactions, and the like. Using digital signature techniques to validate stored electronic data can provide reliable evidence of the origin, identity and status of the electronic data. Thus, digital signature techniques are often used to address the problem of tampering and impersonation in digital communications.

SUMMARY

Embodiments of the invention provide a computer-implemented method for managing interval boundaries of electronic records. The method includes receiving, using a processor, electronic data representing first and second electronic records. Using the processor, electronic data representing a first selection criterion is associated with the electronic data representing the first electronic record, and electronic data representing a second selection criterion is associated with the electronic data representing the second electronic record. Using the processor, the electronic data representing the first electronic record is associated with electronic data representing a group based at least in part on determining that the electronic data representing the second selection criterion is within a predetermined range of a first threshold. Using the processor, electronic data representing a group record that identifies the electronic data representing the group is generated. Using the processor, data representing a third selection criterion is associated with the electronic data representing the group record, wherein the third selection criterion is selected to be within the interval boundaries. Using the processor, an expiration of an interval boundary is identified based at least in part on determining that the electronic data representing the third selection criterion is within a predetermined range of a second threshold.

Embodiments of the invention provide a system for managing interval boundaries of electronic records. The system includes a memory and a processor communicatively coupled to the memory. The processor is configured to perform operations that include receiving electronic data representing first and second electronic records, associating electronic data representing a first selection criterion with the electronic data representing the first electronic record, associating electronic data representing a second selection criterion with the electronic data representing the second electronic record, and associating the electronic data representing the first electronic record with electronic data representing a group based at least in part on determining that the electronic data representing the second selection criterion is within a predetermined range of a first threshold. The operations further include generating electronic data representing a group record that identifies the electronic data representing the group, associating data representing a third selection criterion with the digital data representing the group record, wherein the third selection criterion is selected to be within the interval boundaries, and identifying an expiration of an interval boundary based at least in part on determining that the electronic data representing the second selection criterion is within a predetermined range of a third threshold.

Embodiments of the invention provide a computer program product for managing interval boundaries of electronic records. The computer program product includes a computer readable storage medium having program code embodied therewith. The program code is executable by a computer to implement operations. The operations include receiving electronic data representing first and second electronic records, associating electronic data representing a first selection criterion with the first electronic data representing the electronic record, associating electronic data representing a second selection criterion with the electronic data representing the second electronic record, and associating the electronic data representing the first electronic record with electronic data representing a group based at least in part on determining that the electronic data representing the second selection criterion is within a predetermined range of a first threshold. The operations further include generating electronic data representing a group record that identifies the electronic data representing the group, associating data representing a third selection criterion with the digital data representing the group record, wherein the third selection criterion is selected to be within the interval boundaries, and identifying an expiration of an interval boundary based at least in part on determining that the electronic data representing the second selection criterion is within a predetermined range of a third threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 depicts a diagram illustrating examples of techniques for managing interval boundaries of digitally signed computer-based records that can be stored in groups and efficiently validated at predetermined interval boundaries according to embodiments of the present invention.

DETAILED DESCRIPTION

Figure 1:
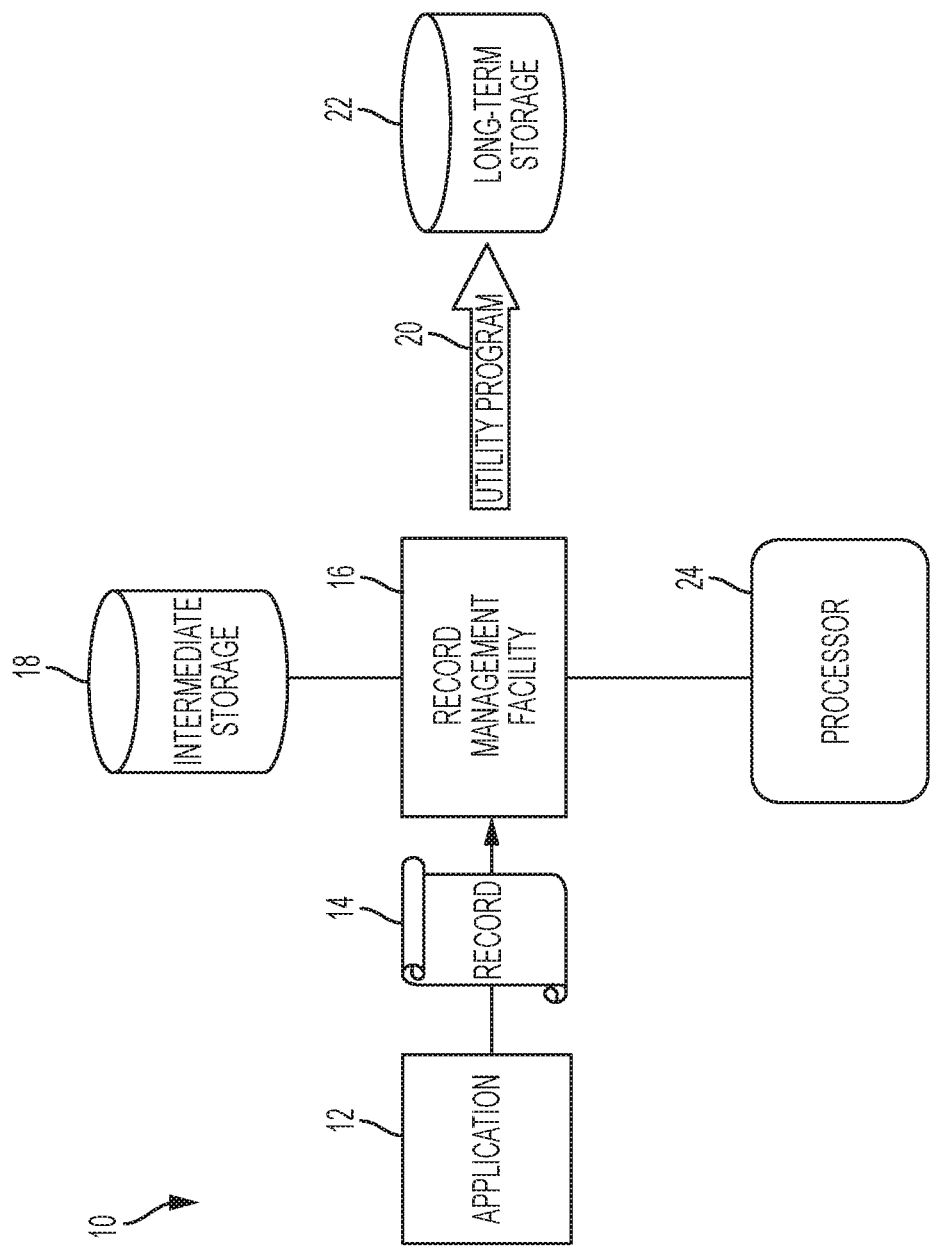
FIG. 1 depicts a schematic diagram of a system for long-term, secure storage of electronic records capable of implementing embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional operations or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are relevant to aspects of the present invention, the demand for long-term, secure storage of electronic records, including, but not limited to computing logs, such as event logs, continues to grow, for example, due to increased regulations and auditing requirements. The need for such storage to be provided in a performance-sensitive manner also has become increasingly important, for example, as a result of the potentially high throughput of logging that can be performed. This need is particularly acute among organizations that do large amounts of logging.

Digital signature techniques have been implemented in some existing record management systems to provide security for electronic records by generating validation data and performing validation. Digital signature techniques incorporate public-key cryptography methodologies to allow consumers of digitally signed data to validate that the data has not been changed, deleted or added. In an example digital signature technique/configuration, a "signer" hashes the record data and encrypts the hash with the signer's private key. The encrypted hash is the signature. The consumer of the record data can hash the same record data, and then use the public key to decrypt the signature and obtain the signer's hash. A consumer attempting to validate a record can compare the consumer's hash with the signer's hash. When the two hash values match, the data content and source(s) of the record are verified.

Electronic record systems can create multiple digital signatures for its records, thus adding additional and more sophisticated levels of security and validation. A consumer attempting to access and validate standard records in a multiple-digital-signature system will need to access the records themselves and each of the required digital signatures. Accordingly, in multiple-digital-signature electronic record systems, it is important that the electronic record system provide the consumer with efficient access to all of the digital signatures required in order to validate records of interest, and provides such access under a variety of record access conditions.

Turning now to an overview of aspects of the present invention, embodiments of the invention include a multiple-digital-signature electronic record system configured to provide, under a variety of record access conditions, efficient access to all of the digital signatures that are required in order to validate records of interest. More specifically, embodiments of the invention provide optimized techniques for accessing and validating records that require at least two types of digital signature for validation, namely "group" digital signatures (or group validation data) based at least in part on the group(s) to which a record belongs, as well as "end-of-interval" digital signatures (or end-of-interval validation data) based at least in part on the interval during which the record was created.

An example electronic record system capable of implementing embodiments of the invention generates group digital signatures and interval digital signatures. The group digital signatures can be generated by tagging each individual (or standard) record as belonging to one or more groups, and by providing a single digital signature stored as a "group" record that applies to all of the "standard" records in a given group. The group can be defined, or delineated, for example, based at least in part on one or more known selection criteria (e.g., a time stamp) related to the anticipated manner in which the records eventually can be accessed. The group(s) of standard records can subsequently be removed from storage, transferred in bulk and validated as a group at predetermined interval boundaries.

The interval digital signature(s) can be generated and stored in an interval record (with metadata) at specific time intervals memorializing an interval count of the original data. The intervals can be defined by downstream processing criteria associated with the data, as opposed to basing the interval on perceived efficiencies at the point of data generation or digital signature generation. In addition to validation through the previously-described group digital signatures, validation also includes processing the original data against the interval digital signature information and comparing a running count of the processed data with the interval count of the interval record(s). Thus, if at any time the interval digital signature does not validate against the original data and/or the running count does not match the interval count, the electronic record system can be configured to analyze the interval record to determine what is wrong with the original data and provide notifications describing the issue.

Because standard records are generated in the multiple-digital-signature system asynchronously, the group digital signatures (or group records) are also generated asynchronously. Because the intervals are generated in the multiple-digital-signature system at predictable times (e.g., based at least in part on a system clock), the interval digital signatures (or interval records) are also generated at predictable times. Because there can be a time delay between the end of an interval and when the group digital signature record is created, the group digital signature record/data for interval N can end up being written during the next interval N+1. Accordingly, a consumer attempting to access and validate standard records in interval N can, under certain circumstances, need to also access interval N+1 in order to retrieve the interval record containing the interval digital signature data for interval N.

Using multiple-digital-signature systems of the type described above, embodiments of the invention leverage the asynchronous nature of when/how standard records and group records (which contain the group digital signature) are created in order to, in effect, "chain" to interval N the interval record (which contains the interval digital signal) that is required in order to validate records in interval N. Using embodiments of the invention, a consumer attempting to access and validate standard records in interval N would not need to access interval N+1 in order to access the interval record of interval N. Using embodiments of the invention, all of the validation information required to validate standard records in a given interval N (e.g., the group records in interval N, along with the interval records of interval N) can be performed based at least in part on an access operation targeted to interval N.

Embodiments of the invention can be applied to any multiple-digital-signature electronic record system in which log records can be queried based on one or more criteria. Thus, embodiments of the invention can be implemented in a new electronic storage system, or can be added to existing or future electronic storage systems, for example, as an optional add-on feature.

Turning now to a more detailed description of aspects of the invention, FIG. 1 depicts an exemplary multiple-digital-signature electronic record system 10 capable of implementing embodiments of the invention. The system 10 can include an application 12, a standard record 14, a record management facility 16, intermediate storage 18, a utility 20, long-term storage 22, and a processor 24, configured and arranged as shown. The processor 24 can include any computer processing device, or any combination of computer processing devices, capable of supporting the functions of the multiple-digital-signature electronic record system 10. For example, in embodiments of the invention, the multiple-digital-signature electronic record system 10 can be implemented using a mainframe computer, a server, a desktop personal computer, a laptop computer, a notebook computer, a tablet computing device, a mobile computing device, or any combination of these, or any other suitable computer processing device.

In embodiments of the invention, the processor 24 can further include one or more memory devices, including by not limited to read-only memory (ROM), random access memory (RAM), or a cache memory; one or more an input/output (I/O) devices, including but not limited to a monitor, a keyboard, a pointing device; one or more storage devices, including but not limited to a hard disk drive (HDD), a compact disk (CD) drive, an integral or removable solid-state memory device (SSD); a network connection interface; as well as other integral, peripheral or accessory computer components as are known in the art.

The application 12 can include any program, module, software or the like, configured to operate in conjunction with a computer processing device, that can produce records, such as, for example, event logs, that can be digitally, electronically, magnetically, optically, or otherwise, stored. For example, in embodiments of the invention, the application 12 can include a monitoring system, database manager, a word processor, a graphical user interface, a device driver, a network interface manager, or any other suitable program, module, software, or the like. In embodiments of the invention, the application 12 can include an operating system. Embodiments of the invention can include multiple programs, modules, software, or the like.

The record 14 can include any data or information that can be produced in association with the operation of a computer processing device or application, such as, for example, log-files, or event logs, that can be digitally, electronically, magnetically, optically, or otherwise, stored. In embodiments of the invention, the record 14 can include system data, such as, for example, access data, audit data, event audit data, transaction data, security data, performance metric data, or the like. In addition, the record 14 can include client-defined data, such as, for example, billing data, pricing data, or the like. Embodiments of the invention can include multiple types of records.

The record management facility 16 can be configured to perform document management regarding the record 14. For example, the record management facility 16 can perform systematic control over document-related functions, such as, for example, the creation, receipt, classification, indexing, maintenance, use, and disposition of the record 14.

The record management facility 16 can receive, or accept, the record 14 from the application 12. In an exemplary embodiment, each record 14 can include a timestamp, or a timestamp can be associated with each record 14. For example, the timestamp can represent the time at which the application 12 created the record 14, or the time at which the application 12 sent the record 14 to the record management facility 16.

The intermediate storage 18 can be communicatively connected to the record management facility 16. The record management facility 16 can buffer, or temporarily store, the record 14 in the intermediate storage 18 for a period of time, for example, in accordance with an enterprise record retention policy. In embodiments of the invention, the record 14 can be stored in the intermediate storage 18, for example, in a block of records as defined by a policy of the record management facility 16. In an alternative embodiment, the records are not stored in blocks.

The intermediate storage 18 can include any type of computer memory medium organized in any format, such as, for example, a relational model database server, a hierarchical database, an information management system, a virtual storage access method server, a hard disk drive (HDD), a magnetic tape, a disk drive, a compact disk (CD) drive, an integral or removable solid-state drive (SSD), or any other suitable memory medium.

The record management facility 16 can group a set of records together and provide a single digital signature across the set of records. For example, the record management facility 16 can group a set of records based at least in part on one or more selection criteria. The selection criteria can include the manner or method by which the records (e.g., record 14) can be accessed, recalled, retrieved, etc. at a later time.

For example, the main selection criteria exploited can include a time period or a frequency when the records are typically accessed. The time period or frequency can be based on some discrete time unit, for example, at discrete intervals of five minutes, three minutes or one minute. Based on the time period, a single digital signature can be assigned to the groups of records corresponding to the interval. Thus, in this example, as the volume or frequency of records produced per time period increases, the optimization also increases.

In addition to selection criteria of the type described above, multiple sub-criteria can be used to group records. For example, in embodiments of the invention, several types of records can be generated by the application(s) 12. In this case, the record management facility 16 can group records that share more than one sub-criteria as the same type. For example, records that are likely to remain together as they move through post-processing systems can be grouped as a set of records, and a single digital signature can be generated for the set.

As records are processed, for example, by the record management facility 16, each record can be classified as going to one or more intermediate data stores, such as intermediate storage 18. In embodiments of the invention, each data store can be independently managed. In addition, the intermediate storage 18 can be shared by multiple independent computer systems, each having a unique identifier.

The record 14 can later be extracted from the intermediate storage 18, for example, by the utility 20. The utility 20 can include, for example, a utility program configured to receive the record 14 from the record management facility 16, or to retrieve the record 14 from the intermediate storage 18, and send the record 14 to the long-term storage 22. In embodiments of the invention, the utility 20 can use the digital signature(s) to ensure that the integrity of the content, context and structure of the record 14 has been preserved and protected, that is, the authenticity, reliability, trustworthiness, or privacy of the data contained in the record 14 can be verified, or validated, based at least in part on the digital signature(s).

The utility 20 can selectively remove the record 14 according to a predetermined policy, or set of rules. For example, the utility 20 can selectively remove a set of records including the record 14 based at least in part on record type or based at least in part on a timestamp. In embodiments of the invention, the utility 20 can be external to the record management facility 16. Thus, the record management facility 16 and the utility 20 can share an embedded or linked protocol that allows the record management facility 16 to create, or generate, the digital signature and the utility 20 to verify, or validate, the digital signature assigned to a set of records.

The selection criteria can be utilized to group sets of records according to some meaningful or useful basis. For example, the utility 20 can be configured to retrieve records from the intermediate storage 18 and send the records to long-term storage 22 at discrete intervals of time. The interval of time can be referred to as the interval granularity of the utility 20. For example, in an exemplary embodiment, the interval granularity can be one minute. In other words, the utility 20 can be configured to retrieve records from the intermediate storage 18 and send the records to long-term storage 22 each minute, or on the minute boundary. Thus, in embodiments of the invention, each record, which has been organized into group(s), can be further organized based at least in part on the interval in which the record was created. The determination of whether a records falls within a particular interval (e.g., a discrete one-minute interval) can be determined based at least in part on a timestamp associated with each record.

When the utility 20 processes records from the record management facility 16, the utility 20 can provide one or more properties with each record 14, or with each set of records, which can be used to determine which records should be moved from the record management facility 16, or intermediate storage 18, to the long-term storage 22. For example, the utility 20 can provide a start time value and an end time value, which can include some inherent, or fixed, interval granularity, that is, the minimum interval at which the time value can be assigned or differentiated.

A person of ordinary skill in the art will readily apprehend that the record granularity (i.e., the record time stamp granularity) may or may not be the same as the interval granularity. However, in order to provide an optimization advantage, the interval granularity should be coarser than the record time stamp granularity. In other words, in order to achieve performance or efficiency gains, more than one standard record must be produced during each interval of the facility 16. Thus, for example, increased efficiencies can be achieved where the granularity of the record timestamp is a hundredth of a second and the interval granularity of the utility program is a minute.

The utility 20 can further provide a property regarding the record number, or type, and a property regarding the system of origin. Based at least in part on these properties, the multiple-digital-signature electronic record system 10 can be configured to filter the records and place records having different record numbers or records from different systems into segregated long-term storage 22. Additional filters can be defined.

Figure 2:
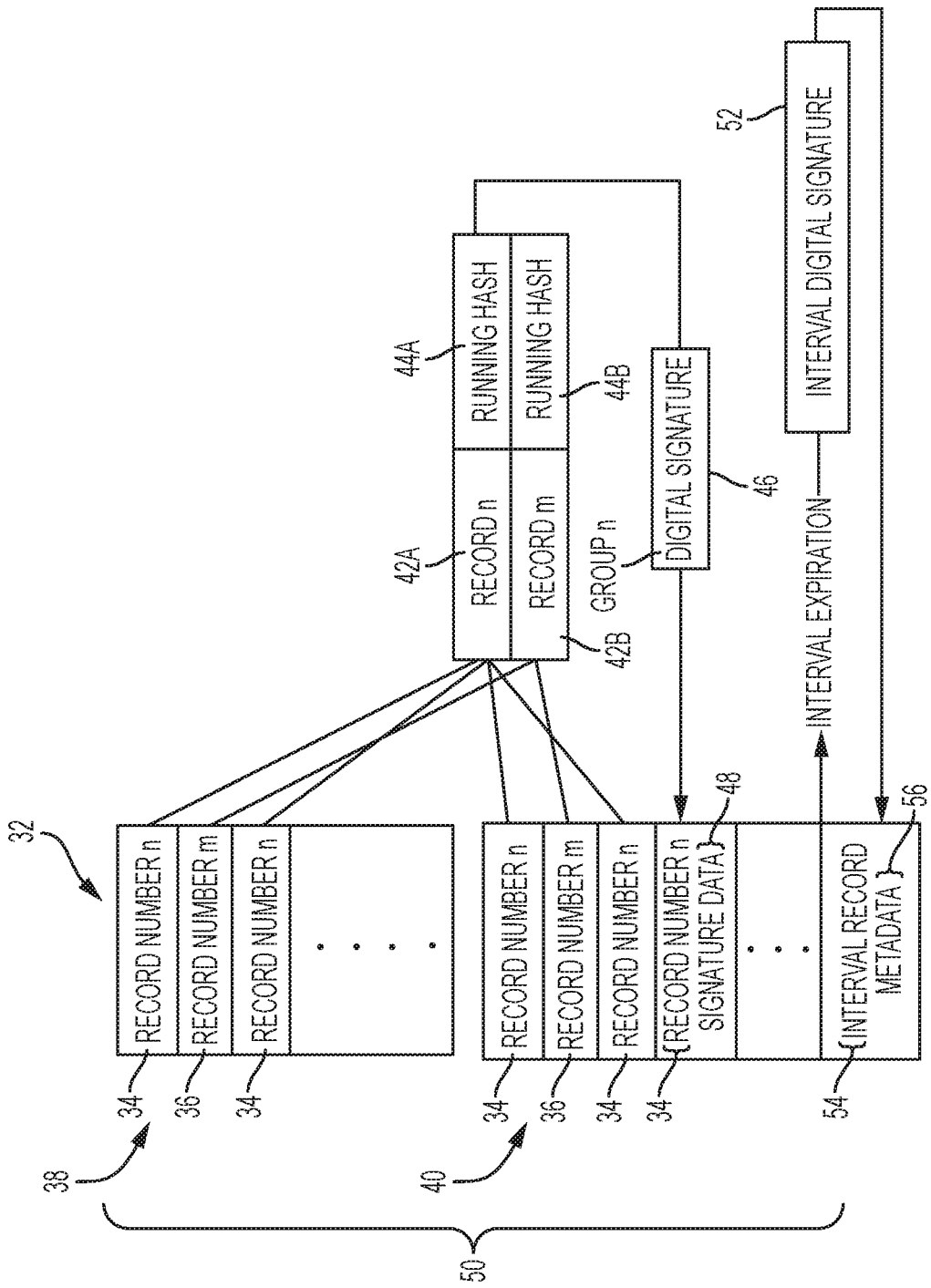
FIG. 2 depicts an illustration of a multiple-digital-signature system capable of utilizing embodiments of the invention.

FIG. 2 depicts a diagram illustrating how standard records can be grouped and digitally signed in a multiple-digital-signature electronic record system (e.g., system 10 shown in FIG. 1). FIG. 2 depicts multiple types of standard records 32. Each type of standard record 32 can be denoted by a record number, such as, for example, record number n 34 and record number m 36. The standard records 32 can be organized into memory blocks, such as, for example, block one 38 and block two 40. Standard records of the same type, that is, records having the same record number, can have the same or similar format, and can be processed together.

As standard records 32 arrive at a record management facility (e.g., record management facility 16 shown in FIG. 1), destined for intermediate data storage (e.g., intermediate storage 16 shown in FIG. 1), the digital signing process begins. Standard records of a specific record number 34, 36 originating from a particular system can be grouped together as groups 42A, 42B, respectively. As records are received, running hash values 44A, 44B can be separately determined for each record number 34, 36, respectively. When group 42A is closed, a group n digital signature 46 can be generated for the entire group 42A of records corresponding to each record number 34. For example, in embodiments of the invention, generation of the group n digital signature 46 can be triggered based at least in part on two thresholds being met. First, the record timestamp has reached the group granularity (e.g., the record accumulation period 50) of the utility program (e.g., utility program 20 shown in FIG. 1), and second, the amount of data which has been hashed is within an optimal range for generation of the group n digital signature 46, that is, the amount of data does not exceed a maximum threshold. The digital signature 46 can be calculated, for example, based on a one-way hash algorithm with encryption. In embodiments of the invention, any suitable hash algorithm, as well as any suitable encryption method, can be employed. A similar process can be followed to generate a group digital signature for group m, as well as for all other groups that fall within the record accumulation period 50.

At the end of the record accumulation period 50, the interval expires, and an interval digital signature 52 can be generated for the groups 42A, 42B of records corresponding to each record number 34, 36. The multiple group digital signatures (e.g., group n digital signature 46) and associated metadata 48 can be stored with the records 32 in long-term storage. In embodiments of the invention, the metadata 48 stored with the digital signature 46 can include, for example, the record number 34, 36 system of origin, the start and end record timestamps, or timestamp range, and the number of records covered by the digital signature 46. Likewise, the interval digital signature (e.g., digital signature 52) and associated metadata 56 can be stored with the records 32 in long-term storage. In embodiments of the invention, the metadata 56 stored with the interval digital signature 52 can include, for example, a running count of the standard records 32 so that the validation operation can include an evaluation of whether the number of records 32 retrieved match the number of records 32 that were stored.

When the utility 20 processes the record 14 and moves it to long-term storage 22, the utility 20 can move multiple groups of records corresponding to one or more discrete time units, or intervals, at a time, and in turn transfer the multiple group digital signatures (e.g., group n digital signature 46) corresponding to the accumulation period (or interval) 50, along with the single interval digital signature (e.g., interval digital signature 52) also corresponding to the accumulation period (or interval) 50. In embodiments of the invention, the standard records 32 corresponding to one or more discrete record accumulation periods 50 can be verified, or validated, by the utility 20 before the set of records is sent to long-term storage 22.

The standard records 32 can be verified as a groups, for example, by a verification program, using the group digital signature 46 and the interval digital signature 52 at a subsequent time when the standard records 32 are retrieved from the long-term storage 22. Verification of the data in the standard records 32 against the group digital signature 46 and the interval digital signature 52 can be performed in like manner to the digital signature generation method above, that is, by keeping a running hash, and clearing the running hash each time a new interval digital signature 52 is encountered and verified, for example, at a time interval boundary.

Figure 3:
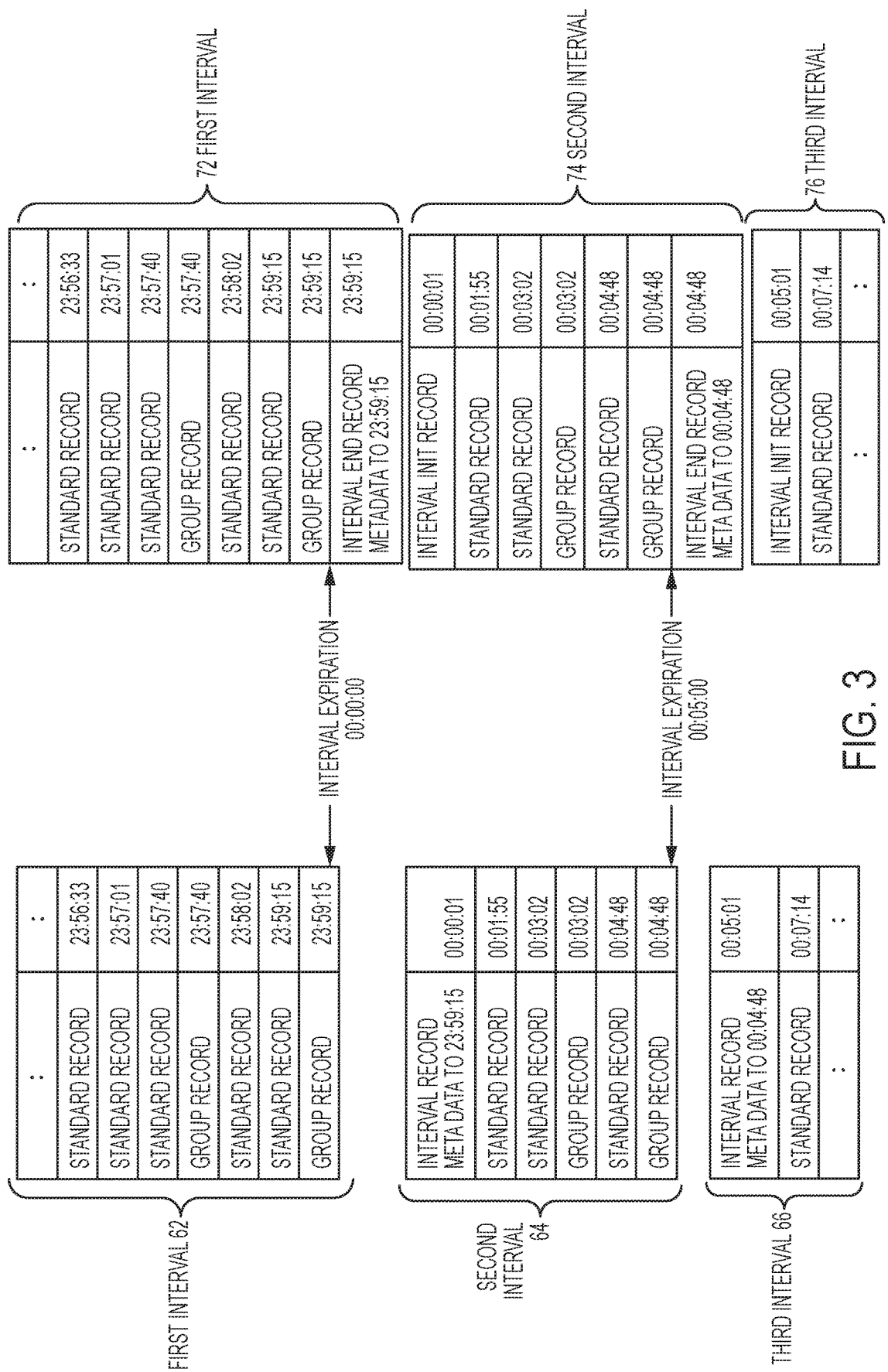
FIG. 3 depicts a diagram illustrating techniques for managing interval boundaries of digitally signed computer-based records that can be stored in groups and efficiently validated at predetermined interval boundaries according to embodiments of the present invention.

FIG. 3 depicts a diagram illustrating, on the right side of the diagram, an example of a record validation process in a multiple-digital-signature electronic record system using an interval boundary management technique according to embodiments of the present in invention. For comparison, FIG. 3 depicts on the left side of the diagram an example of a record validation process in a multiple-digital-signature electronic record system that does not use an interval boundary management technique according to embodiments of the present in invention.

As shown on the left side of FIG. 3, assuming 5 minute intervals, the first interval 62 expired at midnight, the second interval 64 expired at 12:05:00a.m., and the third interval 66 expired at 12:10:00a.m. Because the standard records are generated asynchronously in a multiple-digital-signature system, the group digital signatures (or group records) are also generated asynchronously. Because the intervals are generated at predictable times (e.g., based at least in part on a system clock) in a multiple-digital-signature system, the interval digital signatures (or interval record with metadata) are also generated at predictable times. Because there can be a time delay between interval expiration and when the interval record with metadata (e.g., interval record with metadata to 23:59:15) is created, the interval record with metadata for the first interval 62 ends up being written during the second interval 64. Similarly, the interval record with metadata for the second interval 62 ends up being written during the third interval 66. Accordingly, a consumer attempting to access and validate standard records in the first interval 62 would need to also access records in the second interval 64 in order to retrieve all of the validation data (i.e., group records and interval records with metadata) that are required for validating the standard records of the first interval 62.

As shown on the right side of FIG. 3, again assuming 5 minute intervals, the first interval 72 expired at midnight, the second interval 74 expired at 12:05:00a.m., and the third interval 76 expired at 12:10:00a.m. Because the standard records are generated asynchronously in a multiple-digital-signature system, the group digital signatures (or group records) are also generated asynchronously. Because the intervals are generated at predictable times (e.g., based at least in part on a system clock) in a multiple-digital-signature system, the interval digital signatures (or interval record with metadata) are also generated at predictable times. Because there can be a time delay between interval expiration and when the interval end record with metadata (e.g., interval end record with metadata to 23:59:15) is created, the interval end record with metadata for the first interval 72 would, without benefit of the present invention, end up being written during the second interval 74.

Embodiments of the invention address the above-described time delay by identifying and leveraging the asynchronous nature of when/how standard records and group records (e.g., record number 34 and signature data 48 shown in FIG. 2) are created in order to, in effect, "chain" to the first interval 72 the "interval end record with metadata to 23:59:15" that is required in order to validate standard records in the first interval 72. Embodiments of the invention use the triggering of a group record (e.g., the group record at 23:59:15 of the first interval 72) to trigger the closing of the first interval 72 based at least in part on specific time threshold criterion, for example, the group record time stamp of 23:59:15, and based at least in part on a determination that the group record time stamp is on a boundary (e.g., within a predetermined range of the boundary/threshold) between two intervals. Accordingly, in embodiments of the invention, the group event trigger (e.g., a standard record time stamp crosses a group boundary/threshold) that closes a group, and that is determined, according to embodiments of the invention, to be within a predetermined range of an interval boundary, plays a dual role in that such a group event trigger is also used to trigger the sequence of operations that close the current interval. In the example shown in FIG. 4, the current interval is closed with the time stamp of the group event trigger (e.g., 23:59:15). In embodiments of the invention, the current interval can also be closed with any time stamp that falls within the first interval 72 or with the last time stamp that falls within the first interval 72 (e.g., 23:59:59). The granularity of the novel method can be tuned by tuning the granularity of when group records are generated.

Using embodiments of the invention, a consumer attempting to access and validate standard records in the first interval 72 would not need to access the second interval 74 in order to access the interval end record with metadata (e.g., interval end record with metadata to 23:59:15) required in order to validate standard records in the first interval 72. Using embodiments of the invention, all of the validation information required to validate standard records in the first interval 72 can be performed based at least in part on an access operation targeted to the first interval 72. The required validation information can include, for example, the group records in the first interval 72, along with the "interval end record with metadata to 23:59:15," which, despite being created after interval expiration at 00:00:00, has now been in effect "chained" to the first interval 72. This novel interval management approach allows the standard records and validation information (e.g., group digital signature 46 and interval digital signature 52 shown in FIG. 2) of a single interval to be fully contained in and/or associate with the single interval.

FIG. 4 depicts non-limiting examples showing additional details of how an interval can be closed according to embodiments of the invention. According to embodiments of the invention, an interval is considered to be closed when a verification operation performed on records in the interval does not need to access information from another interval in order to perform the verification. Scenario 1 and scenario 2 depicted in FIG. 4 demonstrate two non-limiting examples of how the time stamp of the interval end record can be "pulled into" or "chained" to the interval to which the interval end records applies.

Embodiments of the invention leverage the time stamp concept of how a multiple-digital-signature electronic record system (e.g., system 10 shown in FIG. 1) can group records based at least in part on the record's time stamp. As describe herein, records can be grouped together, and multiple groups can be provided inside of an interval. Groups are generated with a predetermined granularity (e.g., 1 minute) based at least in part on the actual time stamp in the record. Whenever a record time stamp crosses a "group" (e.g., 1 minute) boundary, a group is closed. Prior to embodiments of the present invention, the process for closing a group was completely separate from interval processing.

Turning now to the first scenario shown in FIG. 4, because records are being asynchronously written, and because periodic intervals are also happening, the trigger after 00:00:00 can either be a record being written or it can be a clock triggered interval expiration event. Embodiments of the invention account for both possibilities because there is no guarantee that the system (e.g., system 10 shown in FIG. 1) will always generate the interval before generating the record. For instance, if a record is written at 1 ms after 00:00:00, that record might actually come in before the interval for 00:00:00 has completed processing.

The embodiments of the invention illustrated by the first scenario in FIG. 4 leverages the observation that operations that trigger the closing of a group can also be used to trigger the closing of an interval. For example, in multiple-digital-signature electronic record systems (e.g., system 10 shown in FIG. 1) that collect data records into groups, when a new record is written that crosses a group boundary (e.g., Rec n2), and if that new record is also determined by the system (e.g., system 10 shown in FIG. 1) to be within a predetermined range of an interval expiration, that new record triggers closing both the group (i.e., Group Record—23:59:02) and the interval (i.e., New Interval Record—23:59:02). When the interval is closed in this manner, the system creates an interval end record with metadata. The system can according to embodiments of the invention provides the interval end record with metadata with a time stamp that is within the associated 5 minute interval. For example, the interval end record with metadata can be provided with the same 23:59:02 time stamp as the last record in the interval. Subsequently, the regularly scheduled interval record (which is likely empty) occurs, and processing proceeds as usual.

The embodiments of the invention illustrated by the second scenario shown in FIG. 4 depicts when the interval expires before any more records are written. In that case, the interval processing is configured to recognize that interval expiration time boundary has been crossed, close the group, close the interval within the current interval, and then proceed to normal processing. Subsequently, the regularly scheduled interval record (which is likely empty) occurs, and processing proceeds as usual.

Figure 5:
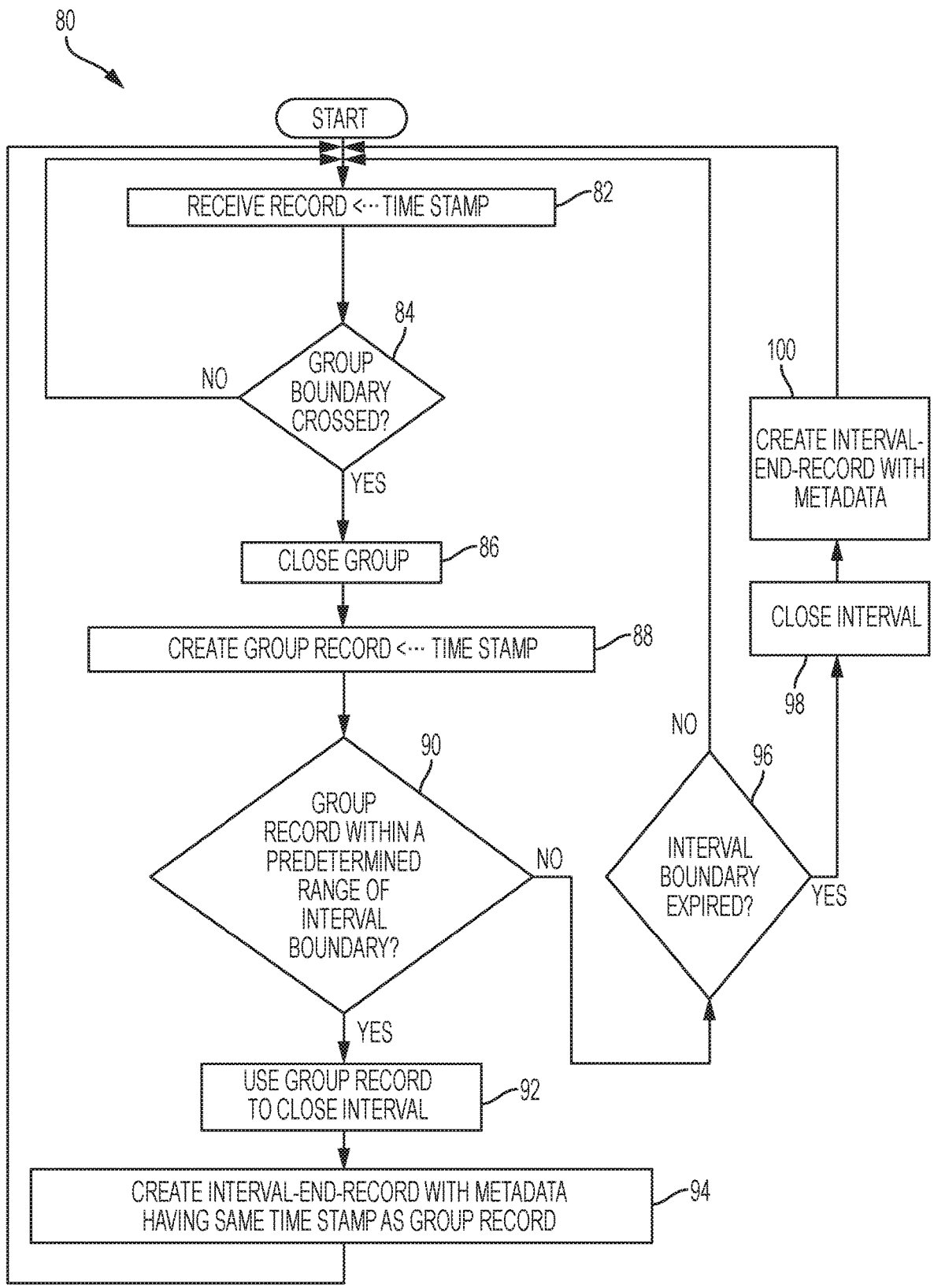
FIG. 5 depicts a flow diagram of a method of managing interval boundaries of digitally signed computer-based records that can be stored in groups and efficiently validated at predetermined interval boundaries according to embodiments of the present invention.

FIG. 5 depicts a flow diagram illustrating a methodology 80 according to embodiments of the present invention. In block 82, a standard record is received, and a time stamp is associated with the standard record. Decision block 84 determines whether or not the time stamp applied in block 82 crossed a group boundary (e.g., 1 minute group granularity). If the answer to the inquiry at decision block 84 is no, the methodology 80 returns to block 82 to receive another standard record. If the answer to the inquiry at decision block 84 is yes, the methodology 80 proceeds to block 86 where it closes the group. In block 88 a group record is generated and associated with a time stamp that is within the start/stop of the group boundary crossings. For example, the time stamp in block 88, assuming the one (1) minute group granularity and the five (5) minute intervals used in FIGS. 3 and 4, could be the last time stamp of 23:59:50 before the stop group boundary crossing at 00:00:00. Decision block 90 determines whether or not the group record generated at block 88 has a time stamp that is within a predetermined range of an interval boundary. If the answer to the inquiry at decision block 90 is yes, the methodology 80 proceeds to block 92 and uses the group record and time stamp generated at block 88 to close the interval. Block 94 generates an interval end record and metadata having the same time stamp as the group record generated in block 88. From block 94, the methodology 80 returns to block 82 to receive another standard record.

If the answer to the inquiry at decision block 90 is no, the methodology 80 proceeds to decision block 96 to determine whether the interval has elapsed. If the answer to the inquiry at decision block 96 is no, the methodology 80 returns to block 82 to receive another standard record. If the answer to the inquiry at decision block 96 is yes, the methodology 80 moves to block 98 and closes the interval. Block 100 generates an interval-end-record with metadata, and then the methodology 80 returns to block 82 to receive another standard record The flowchart and block diagrams depicted herein are example embodiments of the invention described herein. Variations can be made to the flowcharts, steps/operations, and block diagrams described and illustrated herein without departing from the spirit of the invention. For instance, the illustrated flowchart operations can be performed in a differing order or operations can be added, deleted or modified. For example, two blocks shown in succession can, in fact, be executed substantially concurrently, or the blocks can sometimes be executed in the reverse order, depending upon the functionality involved. Each block of the block diagrams and/or flowchart illustration, as well as the combinations of blocks in the block diagrams and/or flowchart illustration, can be implemented by special purpose hardware-based systems that perform the specified functions or acts, or combinations of special purpose hardware and computer instructions. All of these variations are considered a part of the claimed invention.

The terminology used herein is for the purpose of describing particular embodiments only and is not intended to be limiting of the invention. As used herein, unless the context clearly indicates otherwise, the singular forms "a", "an" and "the" are intended to include the plural forms. The terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially" and equivalents thereof are intended to include the degree of error associated with measurement of the particular quantity based upon the equipment available at the time of filing the application. For example, "about," "substantially" and equivalents thereof can include a range of ±8% or 5%, or 2% of a given value.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described in detail in connection with only a limited number of embodiments, it should be readily understood that the present invention is not limited to such disclosed embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description, but is only limited by the scope of the appended claims.

What is claimed is:

1. A computer-implemented method for managing interval boundaries of electronic records, wherein each interval boundary of the interval boundaries comprises an interval initiation, an interval duration, and an interval expiration, the method comprising:

subsequent to the interval initiation, receiving, using a processor, electronic data representing a first electronic record, wherein the electronic data representing the first electronic record was created during the interval duration;

associating, using the processor, electronic data representing a first selection criterion with the electronic data representing the first electronic record;

subsequent to the interval initiation, receiving, using the processor, electronic data representing a second electronic record, wherein the electronic data representing the second electronic record was created during the interval duration;

associating, using the processor, electronic data representing a second selection criterion with the electronic data representing the second electronic record;

associating, using the processor, the electronic data representing the first electronic record with electronic data representing a group based at least in part on determining that the electronic data representing the second selection criterion is within a predetermined range of a first threshold;

generating, using the processor, electronic data representing a group record that identifies the electronic data representing the group;

associating, using the processor, data representing a third selection criterion with the electronic data representing the group record, wherein the third selection criterion is selected to be within the interval boundary; and identifying, using the processor, the interval expiration based at least in part on determining that the electronic data representing the third selection criterion is within a predetermined range of a second threshold;

wherein the interval duration is selected based on a downstream processing criteria that is associated the first electronic record and the second electronic record; and wherein the downstream processing criteria comprises how often the first electronic record is accessed and how often the second electronic record is accessed.

2. The computer-implemented method of claim 1, wherein the first selection criterion, the second selection criterion, and the third selection criterion each comprise a time stamp.

3. The computer-implemented method of claim 1 further comprising generating electronic data representing an interval-end record based at least in part on determining that the electronic data representing the third selection criterion is within the predetermined range of the second threshold.

4. The computer-implemented method of claim 3 further comprising associating the electronic data representing the interval-end record with the electronic data representing the third selection criterion.

5. The computer-implemented method of claim 4, wherein:
the interval initiation comprises a first time;
the interval expiration comprises a second time; and
the electronic data representing the third selection criterion comprises a time stamp between the first time and the second time.

6. The computer-implemented method of claim 1 further comprising, based at least in part on determining that the electronic data representing the third selection criterion is not within the predetermined range of the second threshold, receiving, using the processor, electronic data representing a third electronic record.

7. The computer-implemented method of claim 1 further comprising, based at least in part on identifying the expiration of the interval boundary, generating an interval digital signature.

* * * * *